Dec. 8, 1953   C. W. HANSEN   2,661,585
FIELD FORAGE HARVESTER
Filed June 29, 1946   10 Sheets-Sheet 1
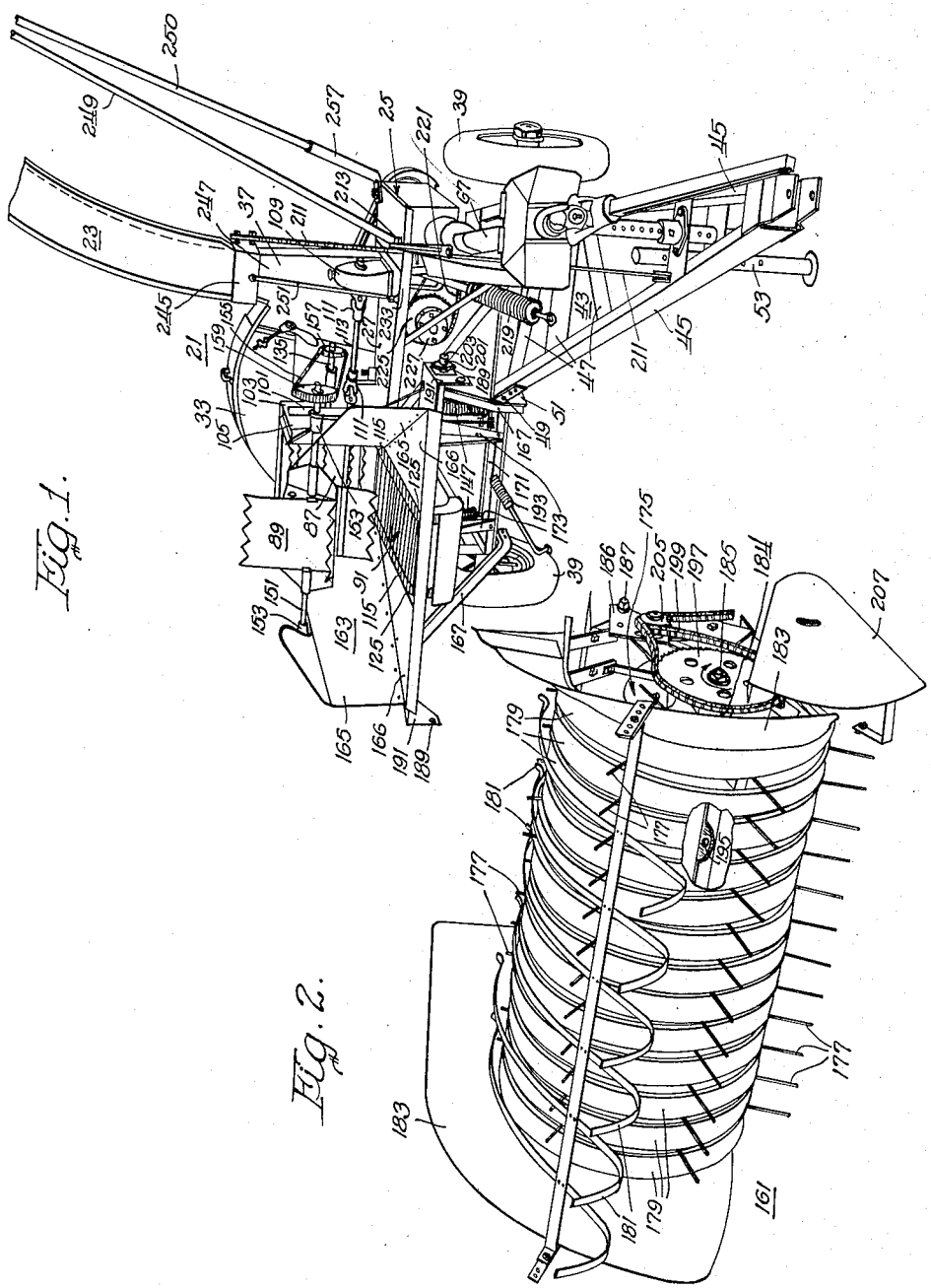

Dec. 8, 1953
C. W. HANSEN
2,661,585
FIELD FORAGE HARVESTER
Filed June 29, 1946
10 Sheets-Sheet 2
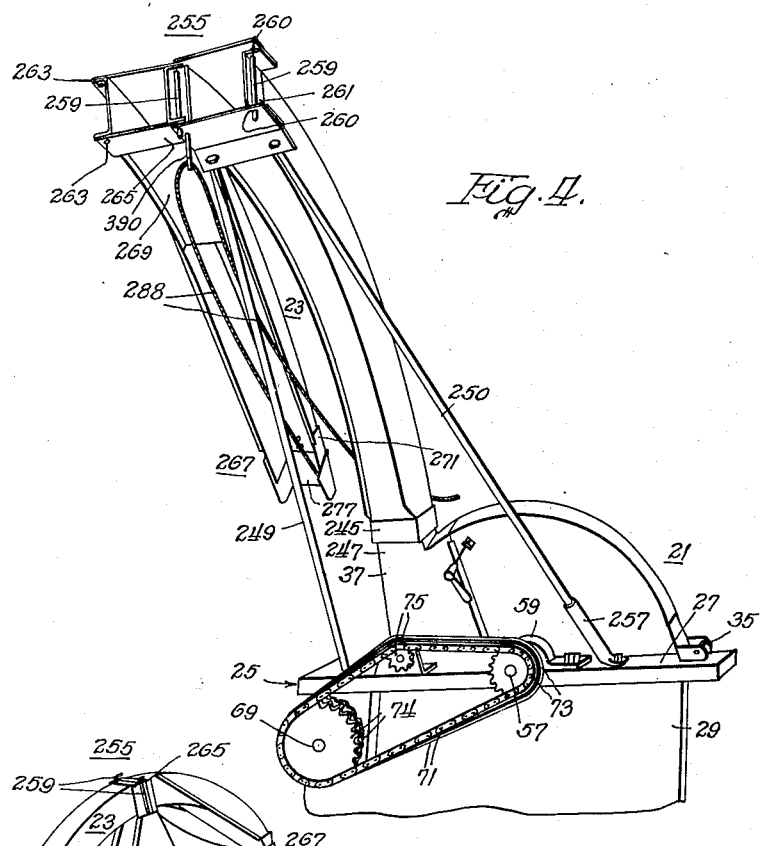
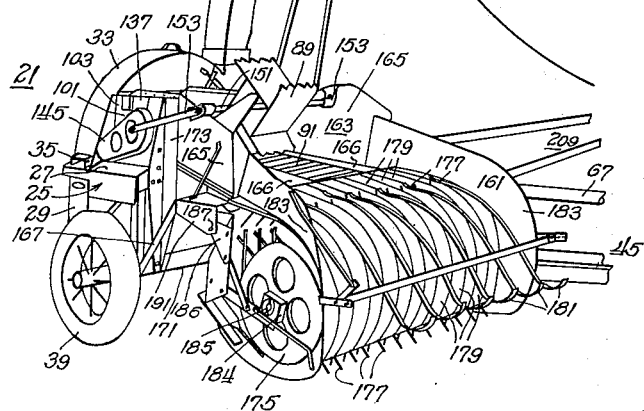
Inventor.
Charles W. Hansen
By Soans, Pond & Anderson
Attorneys Dec. 8, 1953  C. W. HANSEN  2,661,585
FIELD FORAGE HARVESTER
Filed June 29, 1946  10 Sheets-Sheet 3
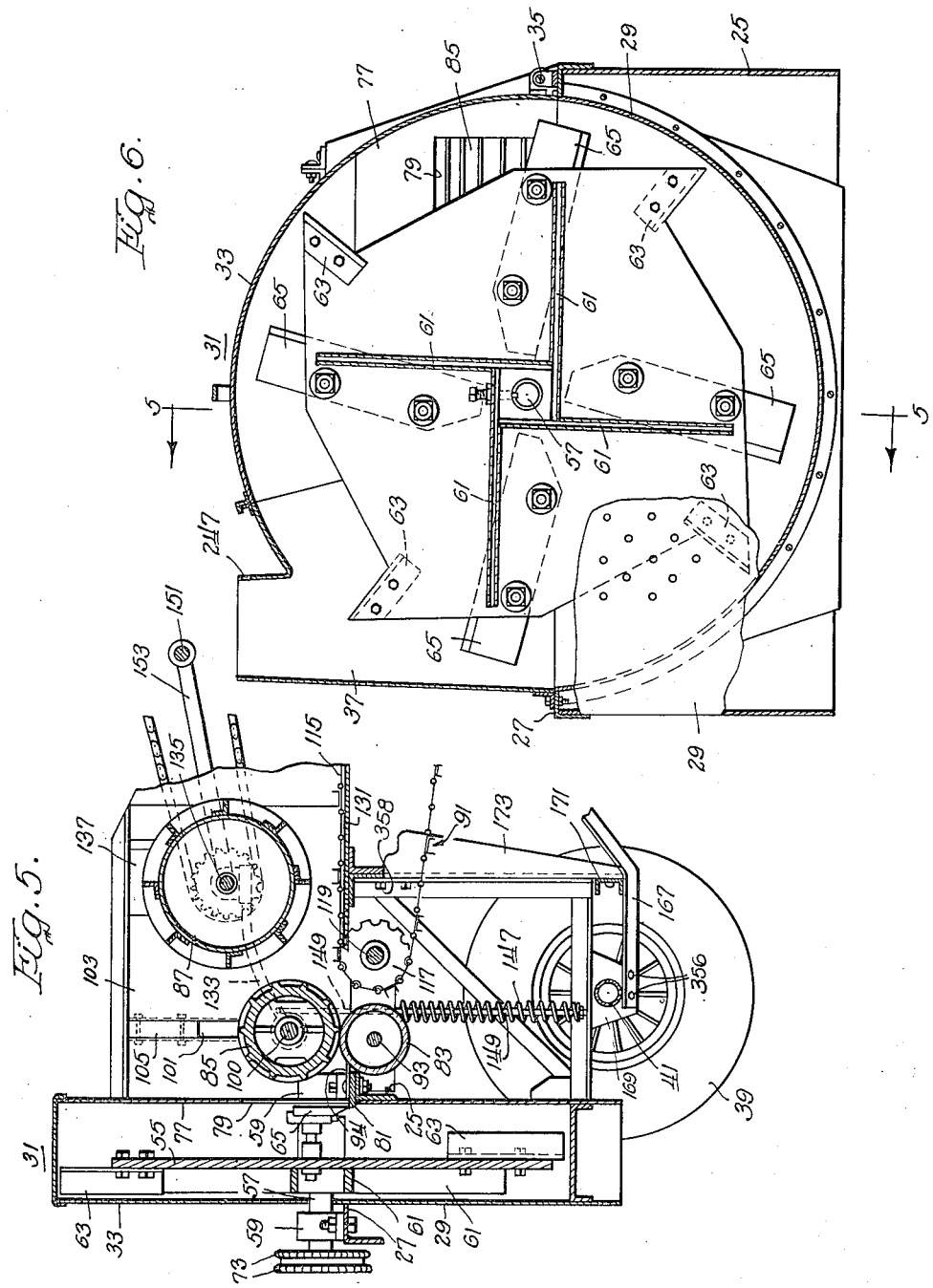
Inventor:
Charles W. Hansen.
By Doane, Pond & Anderson
Attorneys

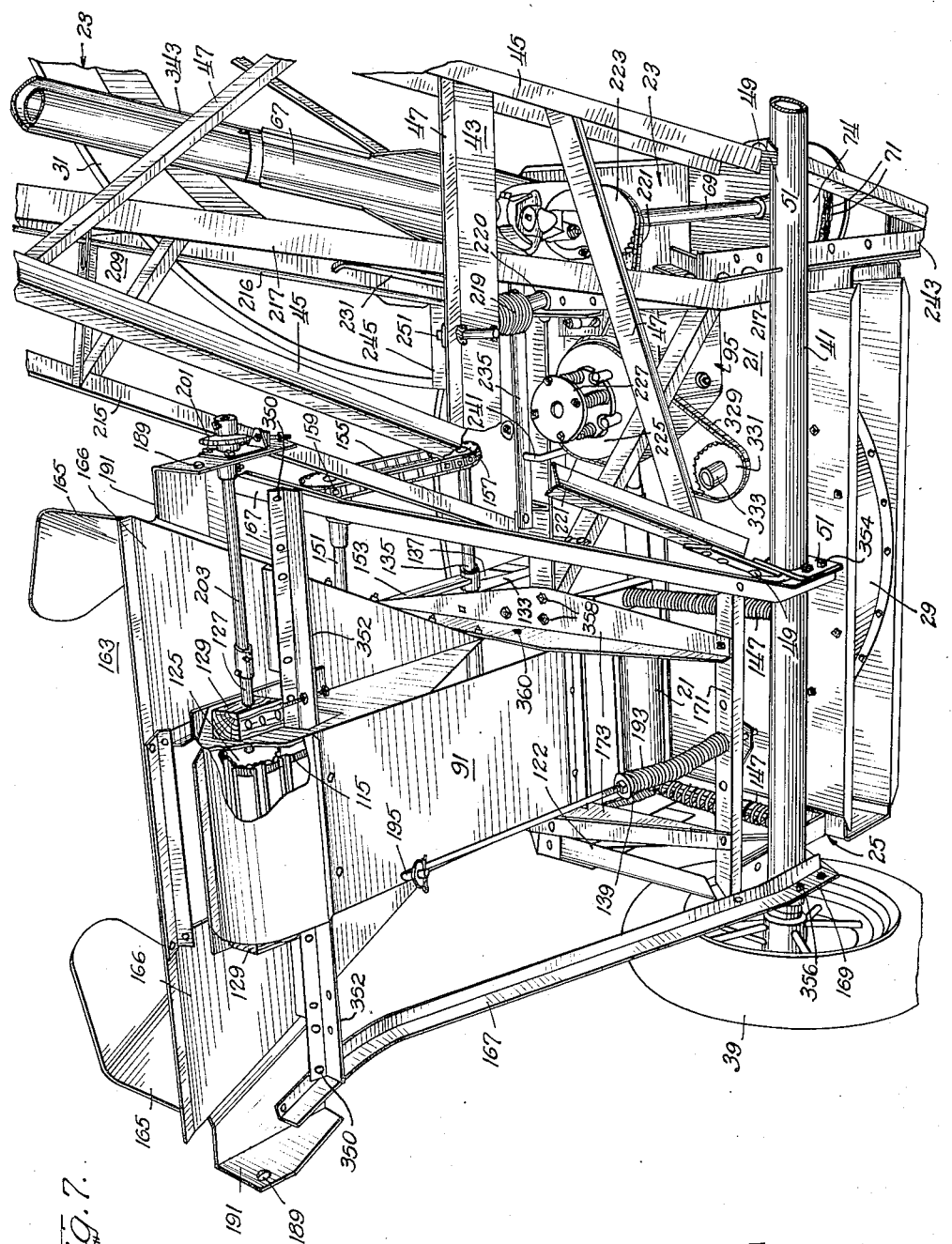

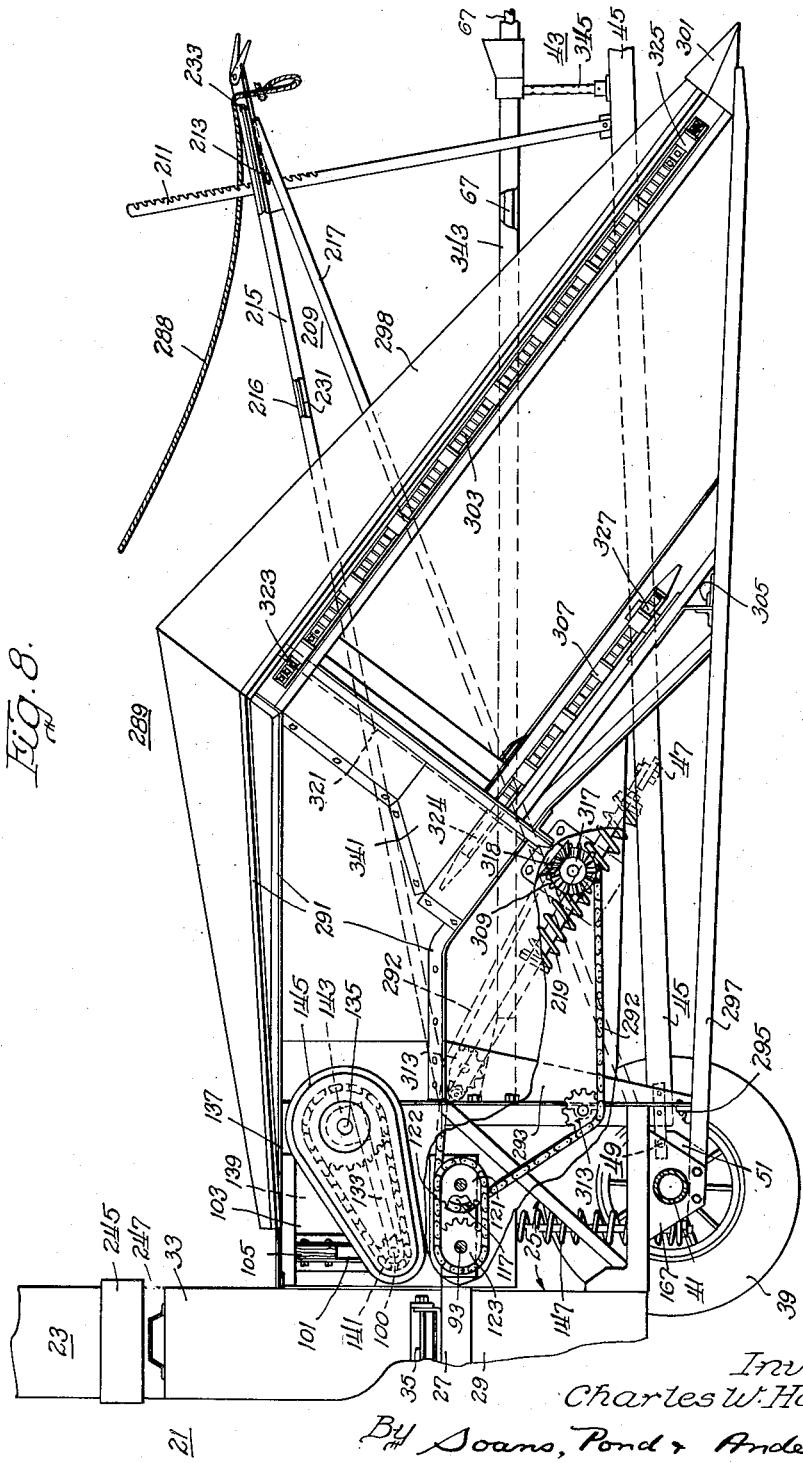

Dec. 8, 1953   C. W. HANSEN   2,661,585
FIELD FORAGE HARVESTER
Filed June 29, 1946   10 Sheets-Sheet 6

Inventor:
Charles W. Hansen.
By Soans, Pond & Anderson
Attorneys

Dec. 8, 1953     C. W. HANSEN     2,661,585
FIELD FORAGE HARVESTER

Filed June 29, 1946     10 Sheets-Sheet 7

Inventor:
Charles W. Hansen.
By Soans, Pond & Anderson
Attorneys

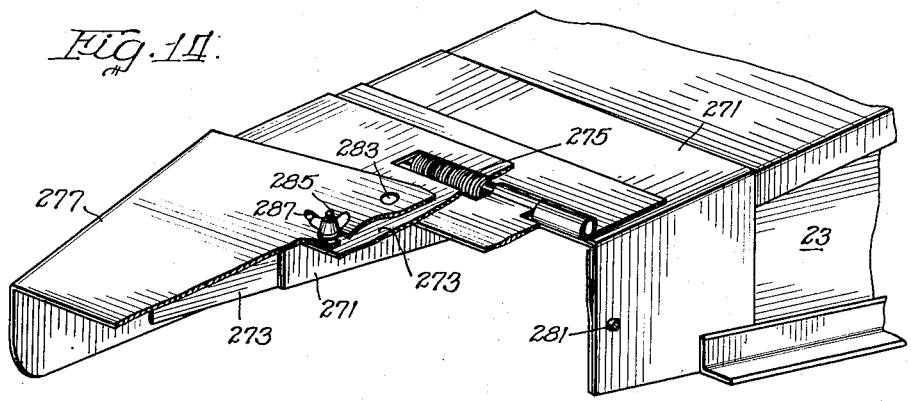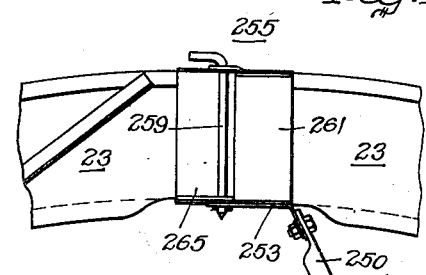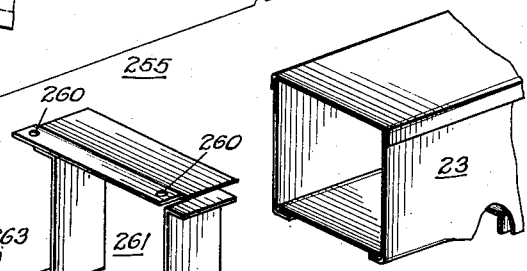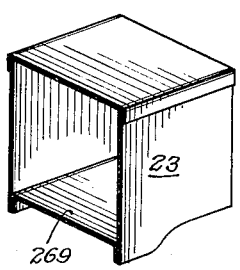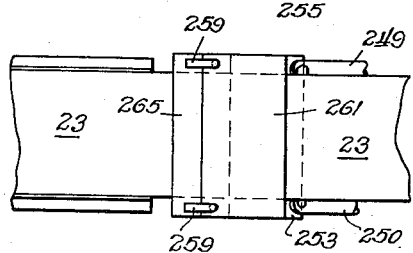

Dec. 8, 1953 C. W. HANSEN 2,661,585
FIELD FORAGE HARVESTER
Filed June 29, 1946 10 Sheets-Sheet 10

Inventor:
Charles W. Hansen.
By Doane, Pond & Anderson
Attorneys

Patented Dec. 8, 1953

2,661,585

UNITED STATES PATENT OFFICE 2,661,585

FIELD FORAGE HARVESTER

Charles W. Hansen, Racine, Wis., assignor to J. I. Case Company, Racine, Wis., a corporation of Wisconsin Application June 29, 1946, Serial No. 680,447

12 Claims. (Cl. 56—16)

The present invention relates to harvesting equipment of the general type known as field forage harvesters.

Field forage harvesters are relatively new in the farm equipment field, and have resulted from a need for a harvester which will accomplish the harvesting of forage crops grown for silage and the processing of such crops, for delivery to a silo or silage trench, with a minimum of hand labor. In general, it is required that field forage harvesters shall be capable of handling at least two types of forage crops. The first type includes crops such as hay, alfalfa, legumes, grasses, and the like which must be mowed and windrowed and which are sometimes partially or fully dried prior to their being cut or chopped into silage lengths. The other type includes stalk crops, such as corn, sorghum, etc., which are grown in rows and which can be chopped into silage lengths immediately following the cutting of the stalk. The obviously great differences in the handling methods for these two types of crops results in the provision of a harvester having interchangeable crop collecting and feeding units which may be readily combined with a single cutting and processing unit, depending upon the type of crop which is to be harvested.

The principal object of the present invention is to provide an improved forage crop harvester of the above described type. More specific objects of the invention include the provision of an improved means for attaching various interchangeable crop collecting and feeding units to a common cutting and delivery unit, the provision of an improved drive mechanism for a harvester of the subject type, the provision of an improved crop feeding and delivery means for the crop which is being harvested and cut, and the provision of an improved control for the crop collecting and feeding unit and the delivery mechanism. The above and other objects and advantages of the invention are accomplished by the use of novel structural combinations and improvements, the features of which will be made apparent in the accompanying drawings and the following description of certain preferred embodiments thereof.

In the drawings:

Fig. 1 is a perspective view of the cutting and delivery unit and a portion of the crop feeding mechanism of a field forage harvester in accordance with the invention. The feeding mechanism illustrated is intended for use with a windrow pickup;

Fig. 2 is a perspective view of a windrow pickup of a type suitable for use with the feeding mechanism and the cutting and delivery unit shown in Fig. 1;

Fig. 3 is a perspective view on a reduced scale of the complete field forage harvester which results from the assembly of the structures shown in Figs. 1 and 2;

Fig. 4 is a perspective view on an enlarged scale showing the rear end of the crop cutting and delivery unit shown in other figures of the drawings. The view also illustrates an alternative position of the cut crop delivery pipe forming a part of that unit;

Fig. 5 is a fragmentary view with parts broken away showing certain of the details of the crop cutting and delivery unit;

Fig. 6 is a fragmentary view with parts broken away showing certain of the details of the cutter and blower wheel constituting a part of the crop cutting and delivery unit;

Fig. 7 is a perspective view on an enlarged scale of the underside of the apparatus shown in Fig. 1;

Fig. 8 is a side elevational view, with parts broken away, of the forage crop harvester which results from the assembling of a row crop collecting and feeding unit in accordance with the invention and a crop cutting and delivery unit of the type illustrated in Figs. 1 and 3;

Fig. 14 is a perspective view, with parts broken away, of the delivery pipe deflector structure illustrated in Figs. 12 and 13;

Fig. 15 is an exploded perspective view showing certain details of the construction of the hinge connection constituting a part of a delivery pipe in accordance with the present invention;

Fig. 16 is a side elevational view of the delivery pipe hinge connection illustrated in part in Fig. 15. This view also shows certain details of the delivery pipe bracing means;

Fig. 17 is a plan view of the structure illustrated in Fig. 16;

Figure 9:
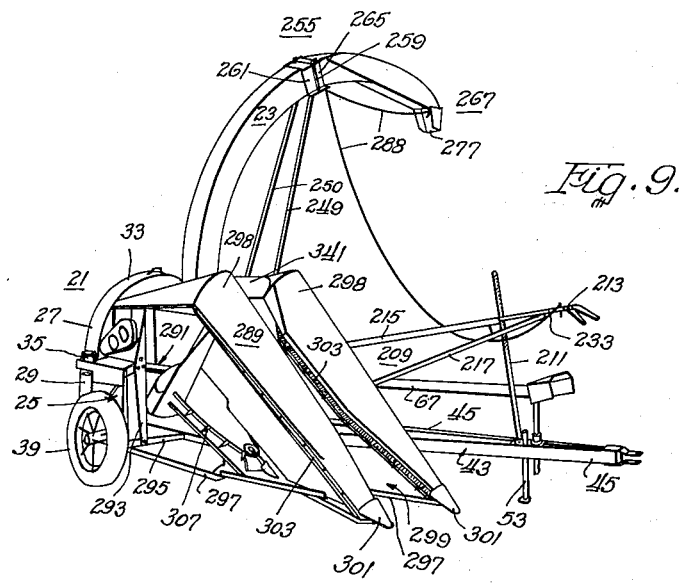
Figs. 9 and 10 are perspective views of the row crop forage harvester shown in Fig. 8.

As previously stated, the forage crop harvesters of the present invention are constructed by combining suitable crop collecting and feeding units with a standardized crop cutting and blower type delivery unit, which is indicated generally at 21 in the drawings. The forage crop harvester illustrated particularly in Figs. 1, 2 and 3 is intended for use in the harvesting of windrow crop materials, and is operable to pick up such material from the windrow, and to convey or feed the crop so collected to the crop cutting and delivery unit 21, where it is cut into suitable short lengths for the making of silage and is subsequently delivered through the blower outlet or delivery pipe 23 to a wagon or other conveyance by which the material is hauled to a silo, silage trench, or other disposition point.

The crop cutting and delivery unit supports the complete harvester and includes a main frame 25 which is fabricated of suitable plate, angle and channel structural members which define a generally horizontal platform portion 27 and a housing 29 for the rotatable cutter and blower wheel means 31. The blower housing 29 is in two halves, the lower half section is rigid with and aids in strengthening the frame structure, and the upper half section 33 is hinged by means of a pin 35 so as to permit opening of the housing for access to the cutter and blower mechanism. At one side of the blower housing 29 there is provided an outlet conduit 37 for the cut crop material, and the outlet or delivery pipe 23, which will be described in a subsequent paragraph, is arranged to fit over the open upper end of the conduit 37.

Suitable support wheels are journalled on an axle 41 (Fig. 7), which is affixed to the frame 25, in order that the harvester may be moved during use. A fabricated yoke-shaped draw bar 43 which includes a pair of channel side sections 45 and suitable cross members 47 is hingedly connected to the axle 41 by means of hinge pins 49 which engage gusset plates 51 fixed, as by welding, to the axle.

It is intended that the complete harvester shall be drawn and powered by a tractor. The forward end of the draw bar 43 is adapted to be connected to the tractor draw bar by means of a suitable hitch pin. The draw bar 43 is provided with an adjustable stand 53 in order that it may be supported at the proper elevation when the harvester is being hitched to the tractor. The stand 53 is, of course, raised during the operation of the machine.

The cutter and blower wheel 55 constituting a part of the crop cutting and delivery unit 21 comprises a plate member which is generally octagonal in form and which is cut from a piece of fairly heavy boiler plate. The cutter and blower wheel 55 is supported for rotation within the blower housing 29 by a shaft 57 which is journalled in bearing 59 affixed to the platform portion 27 of the frame 25, it is provided with four symmetrically spaced ribs 61, four removably mounted vanes or fan wings 63, and with four removable and adjustable cutter knives 65. The cutter and blower wheel 55 is rotated during the operation of the apparatus by means of a direct connection to the harvester power takeoff shaft 67, which connects with the power takeoff on the tractor, and which connection includes a shaft 69 supported on the frame 25, a pair of chains 71 and suitable sprockets 73 and 74 (Figs. 4 and 7). Adequate tension is maintained in the drive chains 71 by two adjustable idler sprockets 75.

The blower fan wings 63 constitute short pieces of heavy angle iron which are bolted to the wheel 55. Preferably the fan wings 63 are affixed to alternate sides of the cutter wheel as illustrated. The provision of the removable fan wings 63 makes possible a convenient adjustment of the volume of air delivered by the blower since two or both of the wings can be removed when required. This is an important feature in an apparatus of this character, which must be capable of handling a wide variety of crop materials.

The sheet metal member 77 which comprises the inner portion of the blower housing 29 is provided with a suitable opening 79 through which the crop material is admitted thereinto for cutting and delivery. A shear plate 81 is supported upon the main frame 25 adjacent the bottom of this opening 79 for cooperation with the cutter knives 65 which are attached to the cutter and blower wheel 55.

The crop material is fed to the interior of the cutter and blower wheel housing 29 by means of a pair of cooperating feed rolls 83 and 85, an intermediate beater or feed roll 87, a main beater roll 89 and a slat type chain conveyor or feed rake 91. The lower feed roll 83 is a smooth surfaced cylindrical roll which is supported for rotation in a fixed, horizontal position relative to the frame 25 by a shaft 93 and suitable bearing means. A scraper plate 94 cleans the surface of the roll 83 during operation of the machine. The lower feed roll 83 is driven from a gear box mechanism 95 by means of a gear 97 which is keyed to the roll shaft 93 and which meshes with one of the output gears 99 of the gear box.

The upper feed roll 85 is desirably of the fluted type, and it is supported upon a suitable shaft 100, as illustrated. This roll must move away from the cooperating lower feed roll 83 in order to permit passage of the crop material between the feed rolls, and accordingly, the roll shaft 100 is supported by bearings (not shown) which are slidable, vertically, in suitable guide slots 101 formed in vertically extending plate members 103 which are rigidly affixed to the front portion of the platform 27. The upper limit of movement of the upper feed roll 85 is defined by a suitable stop 105 which is located within the guide slot 101. The upper feed roll 85 is positively driven from the gear box unit 95 by means of a gear 107 which is supported within a suitable housing shown at 109 in Fig. 1, and a connection which includes a pair of universal joints 111, an intermediate shaft 113 and the shaft 100 upon which the upper feed roll is supported.

Figure 11:
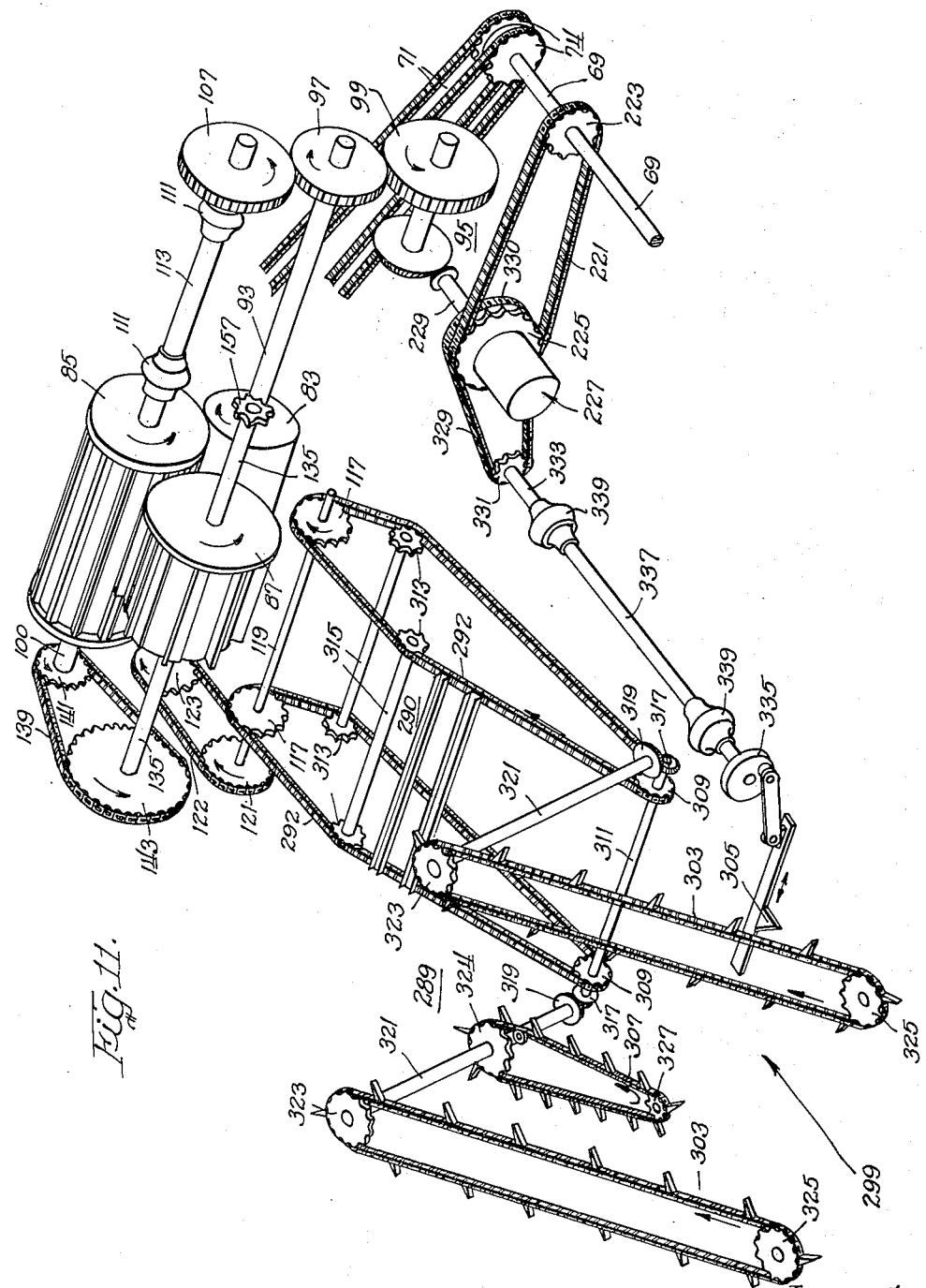
Fig. 11 is a diagrammatic view illustrating the drive mechanism of the harvester illustrated in Fig. 8.

The delivery end of the conveyor or feed rake 91, that is, the portion of the conveyor nearest the feed rolls 83 and 85, includes a support for the two chains 115 comprising spaced sprockets 117 which are keyed to a shaft 119 which in turn is supported on the main frame 25 by suitable bearings. An additional sprocket 121, as indicated in Figs. 8 and 11, is keyed to one end of the support shaft for the conveyor chains 115 and this sprocket is connected by a chain 122 to a suitable cooperating sprocket 123, which is keyed to the driven support shaft 93 for the lower feed roll 83. The crop receiving end of the conveyor 91, that is, the portion of the conveyor most remote from the feed rolls 83 and 85, includes a further support for the chains 115 comprising similar sprockets 125 and a shaft 127 which is journalled in suitable wood bearings 129 which are attached to the frame of the removable crop collecting and pickup and feeding unit. The slats of the conveyor 91 slide upon a suitably formed support 131 which may be of wood, in conventional manner.

The intermediate roll 87 is preferably of the vaned type, as illustrated in the drawings, and it is supported so as to be movable toward and away from the conveyor rake 115 in fixed relation to the upper feed roll 85 by means of a pair of link members 133, each of which is journalled at one end to one end of the supporting shaft 100 for the upper feed roll 85 and at the other end to one end of the supporting shaft 135 for the intermediate roll itself. The ends of the supporting shaft 135 for the intermediate roll 87 engage an enlarged slot 137 provided in the vertical side plates 103. The intermediate roll 87 is driven by means of a drive chain 139 which engages a sprocket 141 on the outer end of the driven shaft 100 for the upper feed roll 85, there being a suitable cooperating sprocket 143 at the outer end of the supporting shaft 135 for the intermediate roll 87. The sprockets 141 and 143 and the drive chain 139, similarly to other exposed drives on the mechanism, are desirably enclosed within a suitable housing, as shown at 145 in Fig. 3.

The mechanically interconnected upper feed roll 85 and the intermediate roll 87 are resiliently biased in a downward direction by means of a pair of compression springs 147 which are located on the underside of the frame platform 27. The springs 147 are operatively connected to the link members 133, which interconnect these rolls, by means of suitable pull rods 149 which engage the link members 133 at a point intermediate the ends thereof, as shown in Fig. 5.

The main beater roll 89 in the structure illustrated in the drawings is of the four wing type. It is supported for rotation about its own axis and for movement relative to the interconnected intermediate and feed rolls, 85 and 87, by means of a shaft 151 and a pair of bearing link members 153, each of which is journalled at one end to one end of the shaft 135 for the intermediate roll 87 and each of which is journalled at the other end to the supporting shaft 151 for the beater roll. The link members 153 serve to hold the beater roll 89 in position relative to the intermediate roll 87, and at the same time, they permit considerable relative movement of the two rolls, each being able to move up and down independently of the other while maintaining substantially uniform horizontal spacing. The main beater roll 89 is driven by means of a drive chain 155 which engages sprockets 157 and 159 on the ends of the supporting shaft 151 for the beater roll. This drive is shown particularly in Fig. 1, and it is desirably enclosed within a shield (not shown) similarly to the drive for the intermediate roll 87.

The crop material which is collected by the windrow pickup 161 normally used with the above described feeder mechanism is guided along the conveyor or feed rake 91 and into the cutter and blower mechanism by means of a suitably shaped hopper or guideway 163 which connects with the vertical plates 103. The hopper 163 is fabricated of sheet metal and includes a pair of upstanding inwardly flaring wing members 165 having the shape illustrated particularly in Figs. 1, 3 and 7. The hopper 163 has bottom sections 166 on either side of the conveyor rake 91 and is reinforced by suitable structural members. The outer end of the hopper 163 is supported by means of a pair of angle braces 167, which are shown particularly in Fig. 7. The outer ends of the braces 167 being detachably joined, as by bolts 350, to the outer ends of a pair of laterally extending members 352 which are suitably fixed at their inner ends to the housing for the chain conveyor 91. The inner end of one of the braces 167 is adapted to be bolted to the central gusset plate 51, as by bolts 354, and the inner end of the other braces 167 is adapted to be bolted to a similar plate 169, as by bolts 356, which may be welded or otherwise integrally attached to the axle 41.

The two angle braces 167 are mechanically connected adjacent the rear ends thereof by a cross piece 171, which in turn is connected to the other portions of the hopper and feed rake mechanism by a pair of rigid, relatively strong, vertically extending, frame elements 173 which are adapted to be releasably attached, as by bolts 358, to the frame 25 of the cutter and blower unit 21. The forwardly extending flanges of the frame elements 173 are releasably attached to the crop collecting and feeding unit by suitable means, such as bolts 360. Since, as will hereinafter appear, the pickup unit 161 is attached to and carried by the frame of the hopper and the feed rake mechanism, it is thus apparent that the entire crop collecting and feeding unit, which picks up the windrowed crop and feeds that crop to the blower and cutter unit 21, may be attached to, or removed from, the blower and cutter unit by the simple expedient of removing the bolts 354 and 356 which connect the angle brace members 167 to the gusset plates 51 and 169, respectively, on the axle 41, and the bolts 358 which connect the two vertical frame elements 173 to the frame 25 of the blower and cutter unit 21. The two chains 115 for the feed rake and the drive chain 155 for the beater roll 89 must be removed prior to the separation of the crop collecting and feeding unit from the cutter and blower unit, but this is likewise a very simple operation.

The windrow pickup 161 may be of any of the known general types. The windrow pickup shown and described in Russell Patent 2,362,861, for example, is particularly suitable for use in the subject apparatus. This mechanism includes a rotatable inner cylinder 175 which supports a plurality of pickup teeth 177 arranged in rows and adapted to project between spaced apart stripper plates 179 which are supported upon the frame of the pickup and which define a generally cylindrical surface. Resilient hold-down strips 181 are provided for holding the picked up crop material in contact with the face of the stripper plates 179, and suitably flared end sections 183 further guide and direct the crop material which is picked up by the teeth 177.

The inner cylinder 175 with its rows of teeth 177 is rotatable, and is supported upon a suitable shaft 185 which is journalled in bearings 184 supported on the pickup frame. The shaft 185 is disposed eccentrically with relation to the outer cylindrical surface defined by the stripper plates 179, and, accordingly, as the teeth 175 are rotated, the amount which they project from between the stripper plates 179 decreases from a given maximum projection at the bottom of the pickup to a very small projection at the top of the cylinder. The teeth 175 rotate in a clockwise direction, when looking at the right end of the pickup in Fig. 2. The net result of the pickup action is a combing of the ground surface by the teeth 177 with movement of the windrow crop which is thereby picked up by the teeth 177 over the surface of the stripper plates 179 under the guiding action of the flexible strips 181 and the flared side portions 183 into the feed hopper 161 where it is moved by the action of the conveyor rake 91, the rolls 89 and 87, and the feed rolls 85 and 83 into the cutter and blower mechanism.

The various elements of the windrow pickup 161 are supported upon a suitable frame structure which is not shown in detail. This frame includes, at either end thereof, a plate member 186 which supports a horizontally extending hinge pin 187. The hinge pins 187 are adapted to fit within openings 189 provided in two plate members 191 which are integrally attached to the frame of the hopper and feed rake structure in order that the pickup may be hingedly connected to that structure. When in this position it is highly desirable that the weight of the pickup shall be counter-balanced in order that it can be moved along the ground with maximum effectiveness and minimum posisbility of damage. This counter-balancing is conveniently accomplished by means of a spring 193, one end of which is supported upon the crosswise frame element 171, and the other end of which is adapted to engage the pickup frame through a connection 195 which permits relative movement therebetween, as shown in Fig. 2.

The inner cylinder 175 of the pickup is adapted to be rotated by means of a sprocket 197 which is keyed to the cylinder supporting shaft 185 and a drive chain 199 which engages a sprocket 201 keyed to an extension 203 of the shaft 127 for the outer end of the feed rake 91, the shaft 127 being driven by the feed rake chains 115. The drive chain 199 is shown disconnected in Fig. 2. Desirably, the pickup includes a takeup sprocket 205 (Fig. 2) for obtaining proper tension on the drive chain 199. A guard, which is shown at 207, in a detached position, is desirably provided for covering the sprockets 197, 201 and 205 and the drive chain.

During the operation of the harvester it is frequently necessary to adjust the height of the pickup 161 or other crop collecting means relative to the ground, and since the conditions requiring such adjustment may change from time to time, it is important that the apparatus include means whereby the relative height of the pickup or other crop collecting means can be adjusted prior to starting up and during the actual running of the harvester in the field. In the illustrated embodiments of the invention this relative adjustment is made possible by virtue of the fact that the draw bar 43 is hingedly connected to the frame 25 of the cutter and delivery unit 21, which frame supports the pickup or other crop collecting and feeding unit. Thus, by providing an adjustable connection between the draw bar 43 and the frame 25 it is an easy matter to adjust the height of the crop collecting means. This connection in the illustrated structures includes a forwardly extending adjusting lever 209 rigidly affixed to the blower and cutter frame 25 and disposed in overlying relation to the drawbar 43. The lever 209 is adapted to be held in various positions relative to the drawbar 43 by means of a notched link 211 and a spring latch connection illustrated at 213.

The adjusting lever 209 constitutes a tripod which is fabricated of three, suitably braced angle sections 215, 216 and 217. The upper angle sections 215 and 216 are affixed to the platform portion 27 of the cutter and delivery unit frame 25. The lower angle section 217 is affixed to one of the structural element in the lower part of the frame 25. It will be apparent that movement of the tripod adjusting lever 209 up and down, relative to the draw bar yoke 43 will rotate both the crop collecting and feeding unit and the crop cutting and delivery unit 21 about the axle 41, thereby altering the position of the collecting means relative to the ground level. In order that this adjustment may be made from the tractor unit without requiring the operator to stop the machine and dismount, the forward end of the adjustment lever 209 is carried to a point just above the end of the draw bar 43, and the weight, or a large portion of the weight, of the mechanism carried on the main frame 25 of the cutter and blower unit 21 is counterbalanced by a suitable compression spring, illustrated at 219. One end of the spring 219 is attached to one of the cross members 47 of the draw bar 43 and the other end engages the blower and cutter frame 25 through a hinge pin connection 220 (Fig. 7).

Power is supplied to the gear box 95, which constitutes the main drive means for all of the driven moving parts of the harvester except the cutter and blower wheel 55, and which may be of the same construction as the gear box and clutch unit illustrated in U. S. Patent 2,385,451, by means of a drive chain 221 which engages a sprocket 223 keyed to the shaft 69 and a sprocket 225 keyed to one side of a jump clutch 227 (see Fig. 7). The other side of the jump clutch 227 is keyed to a shaft 229 which serves as the power input shaft to the gear box 95 as indicated diagrammatically in Fig. 11. The jump clutch 227 provides a convenient indicator for determining when the harvester is operating at full capacity, and in the event of a stoppage of the crop collecting and feeding mechanism for any reason, it prevents breakage or damage to the parts concerned.

Figure 19:
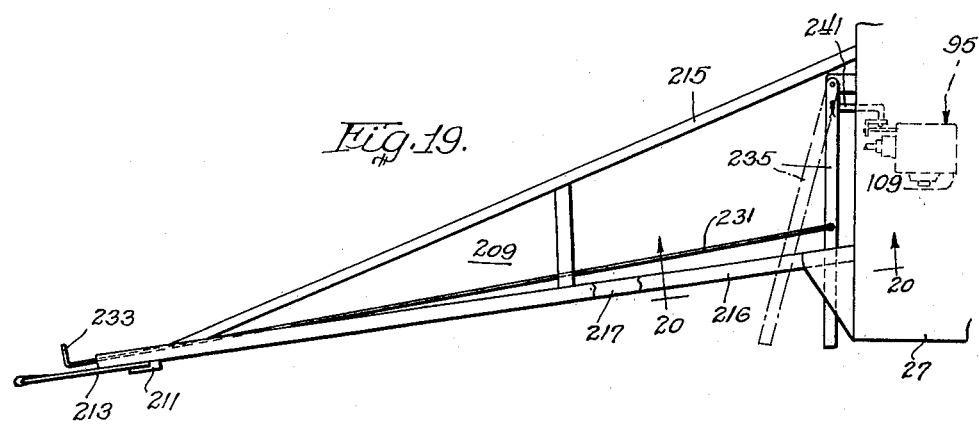
Fig. 19 is a reduced scale, plan view of a portion of the drive control means shown in Fig. 8.
Figure 20:
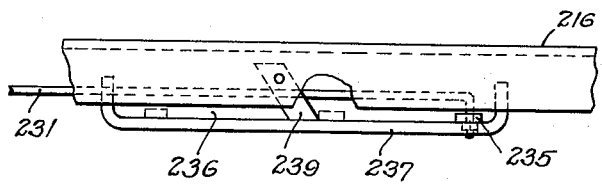
Fig. 20 is an enlarged view taken along the lines 20—20 in Fig. 19 with parts broken away.

Sometimes during the operation of the harvester the mechanism may clog, due to too rapid feeding of the crop material, and in such instances it is usually necessary to stop the crop feeding mechanism. Desirably, this control should be accessible to the operator riding the tractor which powers the harvester, and in the illustrated harvester structures, this control is accomplished by means of an operating member in the form of a rod 231 which is supported on the tripod, height adjusting lever 209 for slidable movement longitudinally thereof. The forward end of the control rod 231 is bent over at right angles in order that it may be conveniently gripped by the operator, as shown at 233 in Fig. 19, and the inner end of the rod 231 engages a pivoted operating link 235. One end of the link 235 is hingedly supported upon the frame 25 of the cutter and blower unit 21, and the outer end is held within a guideway 236 provided by a member 237 which is attached to the vertical web of the upper angle member 216 of the tripod structure 209. This is shown in Fig. 20, and it will be noted that a pivoted stop 239 is affixed to the angle member 216 so as to normally prevent the operating link 235 from being moved forwardly past a position centrally of the guideway 236. The inner end of the operating link 235 is mechanically connected to a clutch mechanism (not shown) which is integral with the gear box 95 by a rod member 241, as shown. The pivoted stop 239 is so positioned that when the control lever 235 is moved by pulling the actuating rod 231 from the position shown in full in Fig. 20 to a position centrally of the guideway 236, as shown in dotted lines in that figure, the clutch will be disengaged and feeding of the crop material will stop.

The gear box 95, in accordance with conventional practice, includes a reversing clutch mechanism which may be brought into operation by moving the control lever 235 to the left-hand end of the guideway 236, this movement being transmitted to the gear box mechanism through the rod member 241. If the harvester feeding mechanism should become completely clogged, making it necessary to reverse the feeding, the pivoted stop 239 may be released by the operator and the control lever 235 moved to put the gear box 95 in reverse operation. When harvesting windrow crops by the use of a pickup type collecting and feeding unit, it is sometimes desirable to move the pivoted stop out of the guideway 236 in order that reversing of the feeding mechanism can be accomplished directly from the tractor. However, when a row type crop collecting and feeding unit is used, reversal of the feeding may be undesirable due to possible disengaging of some of the feed chains, and in such instances the stop 239 should always be used. Movement of the control lever 239 to the central position of the guideway 236 so as to disengage the gear box clutch, and thereby stop the feeding mechanism, does not, of course, stop the rotation of the cutter and blower wheel 55 since the cutter and blower wheel drive is connected directly to the power takeoff shaft 67, as previously described.

The arrangement and structure of the delivery pipe 23 for the crop cutting and delivery unit 21 are important features of the present invention. During the operation of forage crop harvesters of the subject type, it is the usual practice to attach a short tongued wagon or trailer to the rear end of the harvester, as by the hitch shown at 243 (Fig. 10), or a wagon or truck may be driven along side the harvester for the purpose of collecting the cut crop material, whereby that material may be later delivered to a silo trench, silo filler, or other disposition point. To make possibe delivery of the cut crop to either the rear or the side of the harvester, as may be required, the delivery pipe 23 is adapted to extend to either a rear position, as illustrated in Fig. 4, or to a side position, as shown in Figs. 3 and 9. The means whereby this positioning is effected includes a square inner end section 245 of the delivery pipe 23 which is adapted to fit over a suitable square, cooperating section 247 at the delivery end of the outlet conduit 37 which constitutes a part of the cutter and blower housing 29, and braces 249, 250 and 251, which are so located that they properly support the delivery spout in either position. The two braces 249 and 250 comprise strong, relatively rigid, tubular members which are bolted at one end to the platform portion 27 of the frame 25 and which are bolted at the other end to a bracket plate 253 integrally attached to the central portion of the delivery pipe. The delivery pipe 23 is square in cross section and is fabricated of sheet metal. As will hereinafter appear, it is made in two halves which are connected together by a hinge connection 255. The third brace 251 is a short tie member which extends from the lower end of the delivery pipe 23 to the front of the frame platform 27, and which serves the primary function of holding the lower end of the delivery pipe in tight engagement with the cooperating end 247 of the cutter and blower housing 29.

When it is desired to move the delivery pipe 23 from the side discharge position, shown in Figs. 1, 3, 9 and 10, to the rear discharge position shown in Fig. 4, the bolts attaching the two main support members 249 and 250 to the platform 27 are released, the upper end of the smaller support 251 is disengaged from the lower end 245 of the delivery pipe, and the entire delivery pipe is lifted off the delivery end 247 of the blower housing and rotated 90°. The two main support members 249 and 250 are very useful at this time in holding the delivery pipe in proper position. After the rotation has been completed and the cooperating square portions 245 and 247 reengaged, the two main support members 249 and 250 are reattached to the platform 27, as shown in Fig. 4. It will be noted that the support member 249 which was previously located in front of the blower housing 29 is now moved around to substantially the same position which was previously occupied by the other support member 250, and that the support member 250 is now attached to the platform in rear of the blower housing 29 and adjacent the bearing support 59 for the cutter and blower wheel 55. The brace 250 has an adjustable section 257 in order that its length may be adjusted the required amount during this operation.

In order that the harvester may be conveniently moved on the highway and through fence gates, it is very desirable that the delivery pipe 23 be capable of being folded on itself so as to prevent it from projecting materially beyond the support wheels 39 for the harvester. In the apparatus shown in the drawings the delivery spout is split by the hinge connection 255 at substantially the midpoint thereof, and the two sections are connected together by means of two hinge pins 259 which extend through suitable aligned holes 260 provided in a welded, or otherwise fabricated, box-like, structure 261 which is affixed to the inner pipe section as shown particularly in Figs. 15, 16 and 17. The hinge pins 259 are adapted to engage and to lock with similarly aligned holes 263 provided in a cooperating, box-like structure 265 integrally attached to the outer delivery pipe section. It will be noted that removal of either of the hinge pins 259 permits the outer half section of the delivery pipe 23 to be swung around the remaining pin 259 out of endwise engagement with the inner half section and into a position along side of that section. The outer half section of the delivery pipe 23 may be swung in either direction in order that it will clear the brace members 249 and 250, regardless of which position the delivery pipe 23 may be located. This construction resulted after considerable experimentation with various types of folding delivery spouts and is more convenient and less dangerous than any other arrangement which was tested. Upwardly folding pipes, for example, are very difficult to handle, and downwardly folding pipes are inherently quite dangerous.

Figure 12:
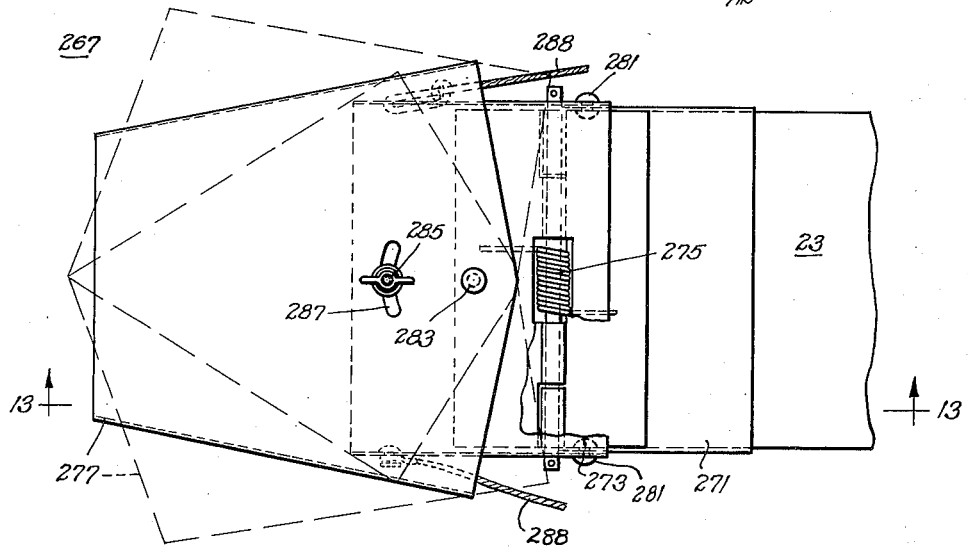
Fig. 12 is an enlarged view of the adjustable delivery pipe for use in connection with the apparatus of the invention.
Figure 13:
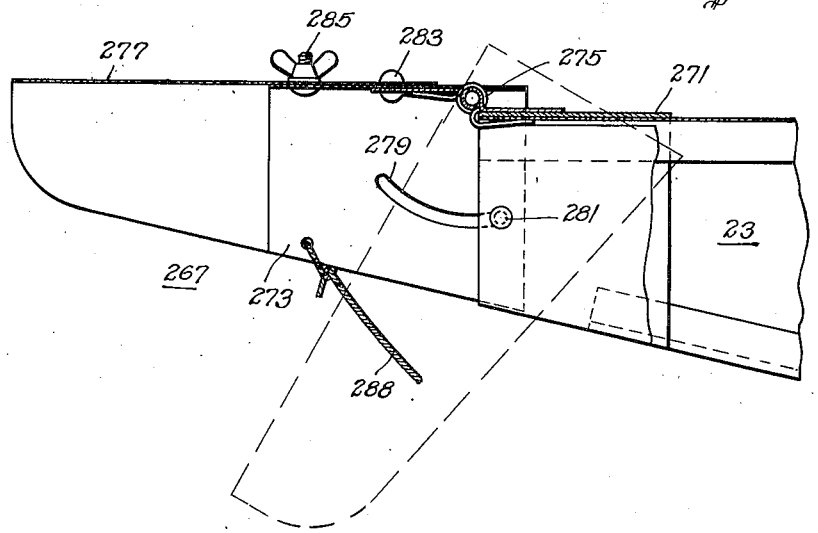
Fig. 13 is an elevational view of the delivery pipe in Fig. 12, with parts broken away.

When cut crop material is being delivered by a forage crop harvester, as described, to a wagon which is following or which is moving along side the harvester, it is advantageous for the delivery means to include some means whereby the cut crop can be directed to various parts of the wagon body. This assures even filling of the wagon, and makes for a more efficient use thereof. The delivery pipe 23 of the cutter and delivery unit 21, as illustrated in the drawing, is provided with an angularly and vertically adjustable guide means 267 for this purpose, which means is shown particularly in Figs. 12 and 13. The bottom of the outer section of the delivery pipe is open from the end of the bottom section 269 outwardly. The guide means 267 includes a stationary channel shaped member 271, having downwardly depending sides or wings, which is fixedly supported on the end of the delivery pipe 23, a second channel shaped member 273 which is hingedly supported on the stationary member 271 by a spring hinge 275, and a deflector 277, which is also channel shaped, adjustably supported on the hinged member 273. The hinged channel shaped member 273 is provided with an annular slot 279 which engages a pin 281 affixed to one side of the delivery pipe 23 for defining the limits of movement of that member and the deflector 277 about the spring hinge 275. The spring hinge 275 biases the members 273 and 277 to the position shown in full in Fig. 13, and the dotted outline in that figure indicates the limit of downward movement. The deflector 277 is fastened to the hinged member 273 by a pin 283 and a wing nut connection 285 which engages a slot 287 provided in the deflector. This arrangement permits the deflector 277 to be swung about the axis of the pin 283 at right angles to the hinge support 275 for the deflector 277 and the deflector support 273. The two extreme positions of the deflector 277 are shown in broken lines in Fig. 12. The deflector 277 may thus be set to cause delivery of the cut crop at an angle to the axis of the delivery pipe, this being particularly advantageous in filling a trailing wagon.

To permit convenient control of the deflector 277 during the operation of the harvester, a rope 288 is attached to the lower end of the deflector support member 273, and this rope is carried back by suitable guide and support means 390 to a position adjacent the handle for the spring latch connection 213 at the forward end of the height adjusting lever 209 and the feed control handle 233. The operator may thus alter the direction of delivery of the cut crop between fairly wide limits by simply pulling the rope 288 so as to lower or raise the position of the deflector 277. The angular position of the deflector about the pin 283 is adjusted prior to the harvesting operation.

Figure 10:
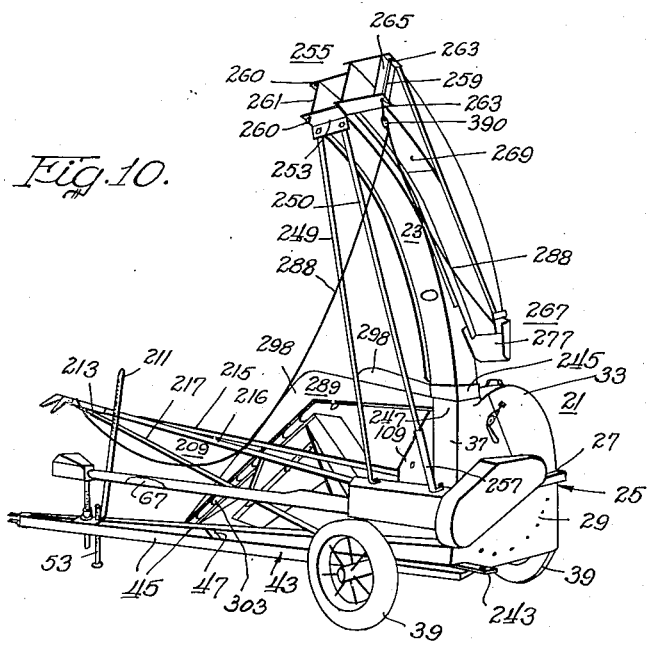

As previously stated, the forage crop harvester of the present invention is adapted for use not only in the harvesting of windrow crops, but also in the harvesting and processing of row crops. Since row fodder crops, such as corn and sorghum, must necessarily be harvested in an entirely different manner from a windrow crop, the harvester of the present invention utilizes a different type of crop collecting and feeding means for such crops. The same crop cutting and delivery unit 21, previously described, is employed, however, and the changeover is accomplished simply by removing the windrow pickup and crop feeding unit from the crop cutting and delivery unit 21 and substituting, therefore, a row crop collecting and feeding means. Such a means is shown in Figs. 8, 9 and 10, in all of which figures the row crop collecting and feeding unit 289 in accordance with the invention has been attached, in operative position, to the crop cutting and delivery unit 21.

It will be noted that the feed rolls 83 and 85 and the intermediate roll 87 are part of the crop cutting and blower delivery unit 21 and, accordingly, are in no way changed when a change is made in the crop collecting and feeding means. Also, since the harvested row crop is fed into the crop cutting and blower mechanism by a rake conveyor or raddle 290 which is generally similar to the conveyor rake 91, the same inner support for the conveyor chains 292, which includes the shaft 119 and the end sprockets 117 thereon, are used when the row crop unit 289 is substituted for the windrow collecting and feeding unit. As previously pointed out, the windrow pickup collecting and feeder unit is separated from the crop cutting and delivery unit 21 by simply disconnecting the angle braces 167, which are bolted to the plates 51 and 169 affixed to the axle 41, and the bolts 358 which connect the vertical frame elements 173 to the frame 25 of the cutter and delivery unit 21. Prior to this operation the conveyor chains 115 and the drive chain 155 for the outer beater roll 89 should be released. When these operations have been carried out, the cutting and delivery unit 21 including the draw bar 43 and the height adjustment means for the crop collecting mechanism may be wheeled away as a unit, and the row crop unit can be installed thereon.

The row crop collecting and feeding unit 289 includes a fabricated frame 291 which is provided with a pair of vertically extending frame elements 293 which are generally similar to the vertical frame elements 173 constituting a part of the frame for the windrow pickup type collecting and feeding previously described. The vertical frame elements 293 are connected by suitable horizontal members, one of which is illustrated at 295, and are adapted to be bolted onto the frame 25 of the cutter and delivery unit 21 in the same manner as the vertical frame elements 173. The frame 291 also includes a pair of generally horizontal braces 297 which are bolted onto the plates 51 and 169 attached to the axle 41 in the same manner as the braces 167. The row crop harvester unit 289 also includes suitable formed guide members 298 which define a stalkway 299 for receiving the crop which is to be harvested. The front ends of the stalkway defining sections 298 terminate in gathering points 301, and a pair of chain rake conveyors 303 are provided along the sides of the stalkway 299 for moving the cut stalks therealong. The mechanism also includes a suitable sickle bar 305 (see Fig. 11), which is located adjacent the bottom of the stalkway 299 a short distance to the rear of the gathering points 301, and a third chain rake 307, located at the bottom of the stalkway 299 for moving the stalks to be cut into engagement with the sickle cutter 305. The relative arrangement of the stalkway racks and the cutter racks is shown particularly in Fig. 11.

The side chains 292 of the slat conveyor 290 which feeds the cut stalks into the feeding rolls 83, 85 and 87 and thence into the cutter and blower means are supported at the end of the conveyor nearest the feeding rolls by the sprockets 117 and the shaft 119, comprising a part of the cutting and delivery unit 21, as previously described. The end of the conveyor most remote from the feeding rolls includes a support for the chains 292 comprising sprockets 309 which are keyed to a shaft 311 journalled upon the frame 291 of the crop collecting and feeding unit. Guide sprockets 313 supported upon suitable shafts 315 determine the path of the intermediate portions of conveyor.

The drive means for the various conveyors 290, 303 and 307 and for the sickle 305 which is used as a stalk cutter are shown particularly in Fig. 11. So far as concerns the drive up to and including the feeder rolls 83 and 85 and the intermediate roll 87, this view is also a correct diagrammatic representation of the drive for the crop cutting and delivery unit 21, as previously noted. The shaft 119 and the sprockets 117 provided for engaging the inner end of the slat conveyors for both of the crop collecting and feeding units is driven from the lower feed roll shaft 93 by a drive chain 122 and sprockets 121 and 123, as previously described. Thus, when the row crop unit 289 is attached to the cutting and blower delivery unit 21 and the drive chains 292 for the slat conveyor 290 are placed around the sprockets 117, the conveyor 290 is connected so as to be driven at a fixed linear speed relative to the peripheral speed of the lower feed roll 83. The supporting shaft 311 for the forward end of the conveyor 290 is driven by the sprockets 309, and a bevel gear 317 is keyed to a short extension provided at either end of the shaft 311. The bevel gears 317 are arranged to mesh with and to drive cooperating gears 319 keyed to the lower end of suitably supported, rotatable shafts 321, which shafts serve as the drive shafts for the chain rakes 303, 305 and 307 operating in the stalkway 299. The actual driving of the chain rakes 303, 305 and 307 is accomplished by suitable sprockets 323 and 324 keyed to the drive shafts 321, and the chain rakes are in turn supported by additional guide sprockets 325 and 327, with or without takeup sprockets as required; the deails of these rake supports are not an important part of the present invention.

The sickle 305 means is driven from the main power shaft 69 through the jump clutch 227, a drive chain 329, a sprocket 330 keyed to the jump clutch output shaft 229, a sprocket 331 supported on a stub shaft 333, which is journalled on the frame 25 of the cutting and delivery unit 21, a pitman drive 335 connected to the sickle bar, and a connection from the pitman drive 335 to the driven stub shaft 333 which includes an extension shaft 337 and two universal joints 339. The various drive mechanism are desirably enclosed within suitable guards such as are illustrated at 341, for the bevel gears 317 and 319 and the shaft 321 and sprockets 323 and 324, and at 343 for the power input shaft 67. The forward end of the power input shaft 67 is supported upon an adjustable support 345 similar to the adjustable support 53 for the draw bar 43.

During the operation of the harvester with either type of crop collecting and feeding means the mechanism is drawn by a tractor which is hitched to the draw bar 43 and which is provided with a power takeoff shaft connected to deliver power to the harvester power input shaft 67. Windrow crops are picked up and fed to the cutter and blower means by operation of the windrow pickup 161, the conveyor 91 and the rolls 89, 87, 85 and 83. The cut crop is continuously delivered by the blower to a wagon or trailer through the delivery pipe 23 as previously described. The operation of the harvester when using the row crop collecting and delivery unit 289 is substantially similar, except that the harvester is drawn along the stalk row in such a manner that the stalks in the row will move into the harvester centrally of the stalkway 299. As the ends of the stalks reach the sickle 305 they will be cut off and the chain rakes 303 and 307 and the conveyor 290 will coact with the rolls 87, 85 and 83 to cause the cut stalks to be fed butt end first along the stalkway and into the cutter and blower housing 29.

Figure 18:
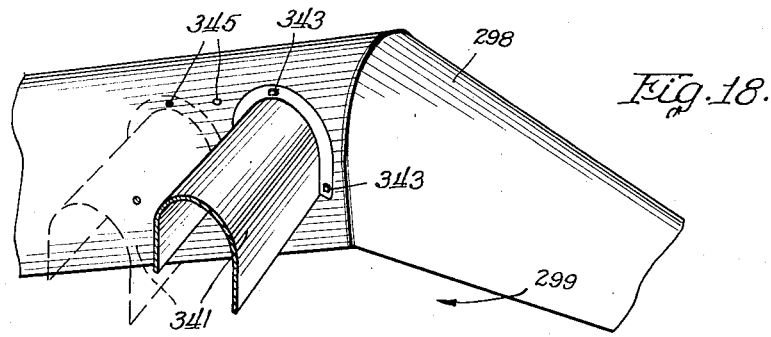
Fig. 18 is a detail view on an enlarged scale of an adjustable stalkway cross bar suitable for use in the harvester illustrated in Fig. 8.

In order to obtain proper longitudinal movement of the cut stalks along the stalkway 299 and into the cutter and blower housing 29, the stalkway 299 is provided with a cross piece 341, illustrated particularly in Figs. 9 and 18. This cross piece is made of sheet metal and is supported on the guide members 298 athwart the stalkway 299, as shown. Operation experience has demonstrated that it is necessary to adjust the position of the cross piece 341 when harvesting different types of crops, if the best results are to be obtained. This adjustment is provided for in the structure illustrated, by the use of suitably spaced releasable screw fastenings 343 which engage spaced openings 345 in the guides 298 to permit convenient removal and relocation of the cross piece along the stalkway.

In the foregoing there have been described the features of an improved field forage harvester which is suitable for the harvesting of substantially all known types of forage crops. The harvester utilizes a single crop cutting and blower type delivery unit, and is so arranged that crop collecting and feeding units for either row type crops or for crops which require mowing and windrowing can be quickly and easily installed on, or removed from the crop cutting and delivery unit. Additional important and novel features include the provision of an improved delivery pipe construction, adapted for either side or rear delivery of the cut crop, improved control means for controlling the operation of the harvester and feeding mechanism, an improved drive arrangement which accommodates either type of crop collecting and feeding unit, and various other operational and constructional arrangements. The various features of the invention believed to be new are expressly set forth in the appended claims.

I claim the following:

1. In a harvester of the class described which is intended particularly for the harvesting of row crops and which is adapted to be drawn by, and powered from, a tractor, a power-operated crop cutting and blower type delivery unit, which includes a main frame and a pair of spaced-apart support wheels journalled on said frame, a crop collecting and feeding unit adapted to be carried by said main frame and to cooperate with said crop cutting and delivery unit, said crop cutting and delivery unit including a power takeoff shaft for delivering power from said tractor thereto, a housing supported on said main frame and having crop inlet and cut crop discharge openings, cutter and blower means supported for rotation within said housing, and means for moving the crop to be cut into said housing, said means including a pair of feed rolls supported by said main frame and driven from said power takeoff shaft, said crop collecting and feeding unit being operable to cut a row crop and to feed such crop to said feed rolls, said crop collecting and feeding unit including spaced-apart side members which define a stalkway, at least one chain rake disposed along said stalkway for feeding cut stalks therealong, a crop cutting means located in said stalkway, a slat type chain conveyor which conducts the cut crop from said stalkway to said feed rolls, and drive means for said chain rake and said slat conveyor comprising at least one drive chain operatively connected with said slat conveyor and supported at the rearward end thereof by a first shaft and sprocket which are driven from said power take-off shaft, a second shaft and supporting sprocket engaging the forward end of said drive chain, a generally vertically extending shaft and sprocket arrangement drivingly supporting the rearward end of said chain rake, and a pair of crown gears, one of which is keyed to said second shaft and the other of which is keyed to said generally vertical shaft, disposed for meshing engagement to transmit driving power therebetween.

2. In a harvester which is adapted to be drawn about a field by a draft vehicle, said harvester including a crop cutting and delivery unit which has a main frame having a pair of spaced apart support wheels journaled thereon, and a crop collecting and feeding unit which includes a frame carried upon said main frame, said crop collecting and feeding unit being disposed in a position forwardly of said crop cutting and delivery unit as determined by the normal direction of movement of said harvester for cooperation therewith, connecting means disposed intermediate said crop cutting and delivery unit and said crop collecting and feeding unit for detachably rigidly uniting said units, said connecting means comprising, two spaced-apart side braces which are disposed generally parallel to the line of draft of the harvester and detachably connected at opposite end portions, respectively, to said main frame and said frame for said crop collecting and feeding unit, and two spaced-apart, generally vertically extending elements detachably connecting the frame of said crop collecting and feeding unit with said main frame, whereby said crop collecting and feeding unit can be attached to, and readily separated from, said crop cutting and delivery unit.

3. In a harvester which is adapted to be drawn about a field by a draft vehicle, said harvester including a crop cutting and delivery unit having a main frame, an axle which extends transversely of the line of draft of said harvester and which is integrally attached to said main frame, a pair of support wheels journaled on said axle, and a crop collecting and feeding unit which includes a frame supported by said main frame, said crop collecting and feeding unit being disposed in a position forwardly of said crop cutting and delivery unit as determined by the normal direction of movement of said harvester, the combination of a connecting means disposed intermediate said crop cutting and delivery unit and said crop collecting and feeding unit for detachably rigidly uniting said units, said connecting means comprising, two spaced-apart side braces which are disposed generally parallel to the line of draft of the harvester, means for rigidly connecting the forward end of each of said braces to the frame of said collecting and feeding unit, means for detachably connecting the rearward end of each of said braces to the axle of said cutting and delivery unit, two spaced-apart generally vertically extending elements, means connecting each of said vertically extending elements rigidly to the frame of said crop collecting and feeding unit, and means for detachably connecting said vertically extending elements to the frame of said crop cutting and delivery unit, whereby said crop collecting and feeding unit can be attached to, and readily separated from, said crop cutting and delivery unit.

4. In a harvester which is adapted to be drawn by, and powered from, a tractor and which includes a power operated crop cutting and delivery unit which has a main frame having a pair of spaced apart support wheels journaled thereon, and a first power operated, supporting sprocket for an endless chain conveyor positioned on said main frame, a crop collecting and feeding unit which includes a frame carried by said main frame, said crop collecting and feeding unit being disposed forwardly of said crop cutting and delivery unit as determined by the normal direction of movement of said harvester, a second supporting sprocket for an endless chain conveyor disposed on said frame of said crop collecting and feeding unit, the power operated mechanism of said crop collecting and feeding unit being operatively connected to said sprocket on said crop collecting and feeding unit, and means for transmitting power to said crop cutting and delivery unit from said tractor, the combination of a connecting means disposed intermediate the frame of said crop collecting and feeding unit and said main frame of said crop cutting and delivery unit comprising, a pair of transversely, spaced apart side braces which extend generally parallel to the line of draft of said harvester, two transversely spaced apart, generally vertically extending structural elements, means for rigidly attaching the forward end of each of said braces and each of said vertically extending elements to the frame of said crop collecting and feeding unit, means for detachably connecting the rearward end of each of said braces and each of said vertically extending elements to said main frame of said crop cutting and delivery unit, said detachable connecting means constituting the main supporting connection between said crop collecting and feeding unit and said crop cutting and delivery unit and permitting convenient attachment and separation of said units, and an endless conveyor chain which is supported upon said first power operated support sprocket on the frame of said crop cutting and delivery unit and said second sprocket on said crop collecting and feeding unit, said endless conveyor chain constituting the primary means for transmitting power from said crop cutting and delivery unit to said crop collecting and feeding unit, said endless conveyor chain being separable to permit convenient attachment and separation of said units.

5. In a harvester which is adapted to be drawn by, and powered from, a tractor and which includes a crop cutting and delivery unit which has a main frame having a pair of spaced-apart support wheels journaled thereon, said crop cutting and delivery unit having an inlet opening on the forward side thereof as determined by the normal direction of movement of said harvester, a crop collecting and feeding unit which includes a frame and which is adapted to move crop materials into the inlet opening of said cutting and delivery unit, said crop collecting and feeding unit extending forwardly of said crop cutting and delivery unit from a position adjacent said inlet opening, the combination of connecting means disposed intermediate the frame of said crop collecting and feeding unit and said main frame of said crop cutting and delivery unit, said connecting means comprising, a pair of transversely spaced-apart side braces which extend generally parallel to the line of draft of said harvester, two mechanically interconnected, transversely spaced-apart, generally vertically extending structural elements, means rigidly attaching the forward end of each of said braces to the frame of said collecting and feeding unit, means rigidly attaching each of said vertically extending elements to the frame of said crop collecting and feeding unit, means detachably connecting the rearward end of each of said braces to said main frame of said crop cutting and delivery unit, and means detachably connecting each of said vertically extending elements to said main frame of said crop cutting and delivery unit, one of said vertically extending elements being disposed at each side of said inlet opening to said crop cutting and delivery unit, said detachable connecting means constituting the main supporting connection between said crop collecting and feeding unit and said crop cutting and delivery unit and permitting convenient attachment and separation of said units.

6. In a harvester which is adapted to be drawn by, and powered from, a tractor and which includes a power operated crop cutting and delivery unit which has a main frame having a pair of spaced-apart support wheels journaled thereon, said cutting and delivery unit having a crop inlet opening on the forward side thereof as determined by the normal direction of movement of said harvester, a first power operated, conveyor support means positioned on said main frame forwardly of said inlet opening, a power operated crop collecting and feeding unit which is adapted to move crop materials to the inlet opening of said cutting and delivery unit, said crop collecting and feeding unit being disposed adjacent said inlet opening and extending forwardly of said cutting and delivery unit and including a frame, means on said frame defining a guideway therebetween which extends along a line generally parallel to the line of draft of the harvester, a second conveyor support means disposed on said frame at the forward end of said guideway, means operatively connecting said collecting and feeding unit to said second conveyor support means in power transmitting relation, and additional means for transmitting power from said tractor to said cutting and delivery unit, the combination of connecting means being disposed intermediate the frame of said collecting and feeding unit and the said main frame of said cutting and delivery unit, said connecting means comprising, a pair of transversely spaced-apart side braces which extend generally parallel to the line of draft of said harvester, two mechanically interconnected, transversely spaced-apart, generally vertically extending frame elements, means for rigidly attaching the forward end of each of said braces to said collecting and feeding unit, means for rigidly attaching one of said vertically extending elements to the frame of said collecting and feeding unit at each side of the guideway defined therein, means for detachably connecting the rearward end of each of said braces to the frame of said crop cutting and delivery unit, means for detachably connecting one of said vertically extending frame elements to the frame of said crop cutting and delivery unit at each side of the inlet opening of said crop cutting and delivery unit, said detachable connecting means constituting the main support connection between said collecting and feeding unit and said cutting and delivery unit and permitting convenient attachment and separation of said units, and an endless conveyor detachably supported in said guideway on said first power operated support means of said cutting and delivery unit and on said second support means on the collecting and feeding unit, said conveyor constituting the primary power transmitting means between said cutting and delivery unit and said collecting and feeding unit.

7. In a harvester which is adapted to be drawn by, and powered from, a tractor and which includes a power operated crop cutting and delivery unit which has a main frame including means defining a housing for a rotatable cutter and blower mechanism and an axle which extends transversely of the line of draft of said harvester, a pair of support wheels journaled on said axle, said housing having an inlet opening on the forward side thereof as determined by the normal direction of movement of said harvester, a portion of said main frame extending forwardly of said inlet opening, and power operated, conveyor support means positioned on said main frame portion forwardly of said inlet opening, a power operated crop collecting and feeding unit which is adapted to move crop materials to the inlet opening of said cutting and delivery unit, said crop collecting and feeding unit being disposed adjacent said inlet opening and extending forwardly of said crop cutting and delivery unit, said collecting and feeding unit including a frame, means on said frame defining a guideway therebetween which extends along a line generally parallel to the line of draft of the harvester, conveyor support means disposed on said frame at the forward end of said guideway, means operatively connecting said collecting and feeding unit to said second conveyor support means in power transmitting relation thereto, and additional means for transmitting power from said tractor to said cutting and delivery unit, the combination of connecting means disposed intermediate the frame of said collecting and feeding unit and said main frame of said cutting and delivery unit, said connecting means comprising two transversely spaced-apart side braces which extend generally parallel to the line of draft of said harvester, two mechanically interconnected, transversely spaced-apart, generally vertically extending elements, means for rigidly attaching the forward end of each of said braces to the frame of said collecting and feeding unit, means for rigidly attaching one of said vertically extending elements to the frame of said collecting and feeding unit at each side of the guideway defined therein, means rigidly interconnecting the lower ends of said vertically extending elements with said braces, means for detachably connecting the rearward end of each of said braces to the axle on said crop cutting and delivery unit, means for detachably connecting said vertically extending frame elements to the portion of the frame of said collecting and delivery unit which is forward of the inlet opening, one of said vertically extending frame elements being disposed on each side of the inlet opening, said detachable connecting means constituting the main support connection between said collecting and feeding unit and said cutting and delivery unit and permitting convenient attachment and separation of said units, and an endless conveyor detachably supported in said guideway on the power operated support means of said cutting and delivery unit and on the support means on the collecting and feeding unit, said conveyor constituting the primary power transmitting means between said cutting and delivery unit and said collecting and feeding unit.

8. Adjusting means for a forage harvester which is adapted to be drawn about a field by a draft vehicle, said harvester including a cutting and delivery unit which has a frame having a pair of spaced apart support wheels journaled thereon, and a crop collecting and feeding unit which is supported on said frame, said height adjusting means being operable to selectively position said crop collecting and feeding unit relative to the ground when said harvester is in use and comprising, a drawbar which is pivotally connected to said frame and which extends forwardly to said draft vehicle, a height adjusting lever which is fixedly connected to said frame for movement therewith about the axis of said support wheels and which extends forwardly to a position over the forward end of said drawbar, and an adjustable connection between said adjusting lever and said drawbar.

9. Adjusting means for a forage harvester which is adapted to be drawn about a field by a draft vehicle, said harvester including a crop cutting and delivery unit which has a frame having a pair of spaced apart support wheels journaled thereon and a crop collecting and feeding unit supported on said frame, said collecting and feeding unit being disposed forwardly of said cutting and delivery unit as determined by the normal direction of movement of said harvester, said height adjusting means being adapted to selectively position said collecting and feeding unit relative to the ground when said harvester is in use and comprising, a drawbar, means including a pivot which is disposed transversely of the line of draft of said harvester for hingedly connecting the rearward end of said drawbar to the lower portion of said frame, additional means for connecting the forward end of said drawbar to said draft vehicle, a height adjusting lever which is fixedly connected at the rearward end thereof to said frame for movement therewith and which extends forwardly, adjacent said drawbar, to a position over the forward end of said drawbar, and an adjustable connection between said adjusting lever and said drawbar, whereby said cutting and delivery unit and said crop collecting and feeding unit may be rotated about said pivot relative to said drawbar, whereby the height of said crop collecting and feeding unit is raised and lowered relative to the ground.

10. Height adjusting means for a forage harvester which is adapted to be drawn about a field by a tractor, said harvester including a cutting and delivery unit which has a frame, an axle integrally attached to said frame, said axle extending transversely of the line of draft of said harvester, a pair of support wheels journaled on said axle, and a crop collecting and feeding unit which is adapted to be supported on said frame, said collecting and feeding unit being disposed forwardly of said cutting and delivery unit as determined by the normal direction of movement of said harvester, said height adjusting means beings adapted to position said collecting and feeding unit relative to the ground when said harvester is in use and comprising, in combination, a yoke-shaped drawbar, means for hingedly connecting the rearward end of said drawbar to the axle on said cutting and delivery unit, said last mentioned means including coaxial pivot pins which extend parallel to said axle, means adapted to connect the forward end of said drawbar to said tractor, a height adjusting lever including three structural elements rigidly attached at their rearward ends to the frame of said cutting and delivery unit at spaced apart points thereon, said elements extending forwardly, adjacent said drawbar, to a position over the forward end of said drawbar, means interconnecting the forward ends of said elements, and an adjustable connection between said adjusting lever and said drawbar whereby said cutting and delivery unit and said collecting and feeding unit may be rotated relative to said drawbar about said co-axial pivot pins, whereby the height of said crop collecting and feeding unit is raised and lowered relative to the ground.

11. In a forage harvester which is adapted to be drawn by, and powered from, a tractor, said forage harvester having a power operated crop cutting and delivery unit which includes a main frame, support wheels journaled on said main frame, means including a power take-off shaft for transmitting power from said tractor to said crop cutting and delivery unit, a power operated crop collecting and feeding unit which is supported upon said main frame and which is adapted to be driven from said crop cutting and delivery unit, a drawbar which is pivotally connected at its rearward end to the main frame of said crop cutting and delivery unit, means for connecting the forward end of said drawbar to said associated tractor, and having means on said drawbar for supporting said power take-off shaft, the combination of control means comprising, power reversing and interrupting means intermediate said power take-off shaft and said crop cutting and delivery unit, a height adjusting lever which is rigidly attached to said main frame at the rearward end thereof and which extends forwardly to a position over the forward end of said drawbar, said height adjusting lever being operable to control the angular relation of said frame and said crop collecting and feeding unit to the axis of said wheels, and a member for controlling the operation of said power reversing and interrupting means for said crop cutting and delivery unit supported upon said height adjusting lever and extending to a position adjacent the forward end thereof.

12. In a harvester which is adapted to be drawn by, and powered from, a draft vehicle, said harvester including a power operated crop cutting and delivery unit which has a main frame having a pair of spaced apart support wheels journaled thereon, a first power operated conveyor support means positioned on said main frame, a power operated crop collecting and feeding unit including a frame carried by said main frame, said crop collecting and feeding unit being disposed forwardly of said crop cutting and delivery unit as determined by the normal direction of movement of said harvester, a second conveyor support means positioned on said crop collecting and feeding unit, means for transmitting power from said draft vehicle to said crop cutting and delivery unit, the combination of a connecting means, disposed intermediate the frame of said crop collecting and feeding unit and said main frame comprising a pair of transversely spaced-apart side braces which extend generally parallel to the line of draft of said harvester, two transversely spaced-apart, generally vertically extending members, means for detachably connecting the forward end of each of said braces and each of said vertically extending members to said frame of said crop collecting and feeding unit, means for detachably connecting the rearward end of each of said braces and each of said vertically extending members to said main frame, said detachable connecting means constituting the main support connection between said crop collecting and feeding unit and said crop cutting and delivery unit and providing convenient attachment and separation of said units, and an endless conveyor which is supported at its opposite ends respectively, upon said first power operated conveyor support means and said second conveyor support means, said endless conveyor constituting the primary means for transmitting power from said crop cutting and delivery unit to said crop collecting and feeding unit.

CHARLES W. HANSEN.

References Cited in the file of this patent

UNITED STATES PATENTS

| Number | Name | Date |
|---|---|---|
| Re. 15,050 | Merwin | Feb. 22, 1921 |
| 722,369 | Leonard | Mar. 10, 1903 |
| 761,761 | Conner | June 7, 1904 |
| 782,444 | Gibbons | Feb. 14, 1905 |
| 826,459 | Wilder | July 17, 1906 |
| 877,304 | Dick | Jan. 21, 1908 |
| 1,241,540 | Merwin | Oct. 2, 1917 |
| 1,284,081 | Fitzpatrick | Nov. 5, 1918 |
| 1,304,001 | Warner | May 20, 1919 |
| 1,340,461 | Ronning et al. | May 18, 1920 |
| 1,353,261 | Morgal | Sept. 21, 1920 |
| 1,416,229 | Morgan | May 16, 1922 |
| 1,502,742 | O'Dell | July 29, 1924 |
| 1,765,115 | Welles | June 17, 1930 |
| 1,793,476 | Gehl | Feb. 24, 1931 |
| 1,906,606 | Hyman | May 2, 1933 |
| 1,922,376 | Krause | Aug. 15, 1933 |
| 2,177,911 | Sommerfeld | Oct. 31, 1939 |
| 2,181,795 | Thompson et al. | Nov. 28, 1939 |
| 2,256,829 | Hyman | Sept. 23, 1941 |
| 2,269,828 | Michel et al. | Jan. 13, 1942 |
| 2,312,612 | Wetmore | Mar. 2, 1943 |
| 2,385,451 | Krause et al. | Sept. 25, 1945 |
| 2,394,996 | Hill et al. | Feb. 19, 1946 |
| 2,420,219 | Baldwin | May 6, 1947 |
| 2,452,153 | Ronning | Oct. 26, 1948 |